(No Model.)
J. D. BACON.
TRAPPED PLUG FOR BOWLS AND TUBS.
No. 300,553. Patented June 17, 1884.
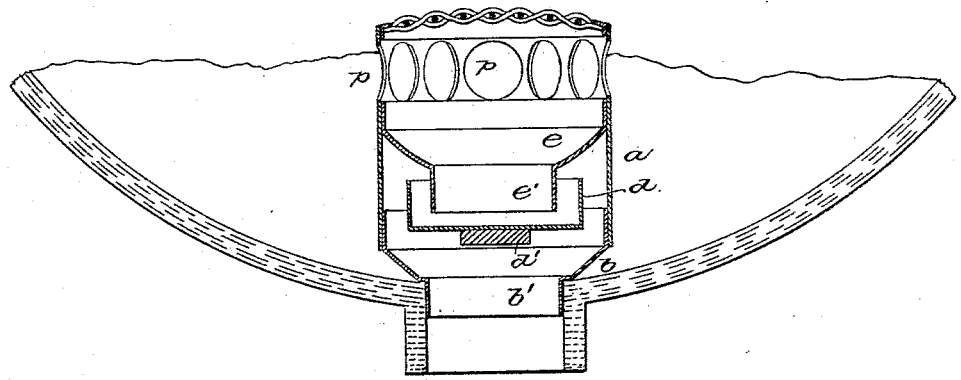
Witnesses.
John F. C. Frinkert
Henry Marsh
Inventor
James D. Bacon
by Crosby & Gregory
attys.

UNITED STATES PATENT OFFICE.

JAMES D. BACON, OF BOSTON, MASSACHUSETTS.

TRAPPED PLUG FOR BOWLS AND TUBS.

SPECIFICATION forming part of Letters Patent No. 300,553, dated June 17, 1884.

Application filed March 14, 1884. (No model.)

*To all whom it may concern:*

Be it known that I, JAMES D. BACON, of Boston, county of Suffolk, State of Massachusetts, have invented an Improvement in Trapped Plugs for Bowls and Tubs, of which the following description, in connection with the accompanying drawing, is a specification, like letters on the drawing representing like parts.

My invention consists in an open or hollow plug provided with a trap, the plug being adapted to close the usual openings at the bottoms of bowls or tubs.

The drawing represents one of my improved trapped plugs in vertical section, the same being set into the opening at the bottom of a wash-bowl, partially shown in section.

The shell $a$ has a base portion, $b$, which is provided with a collar, $b'$, to enter the usual outlet-hole in the bottom of the bowl or tub with which the plug is to be employed to prevent the entrance of sewer-gas into the apartment occupied by the said bowl or tub. The plug being hollow, also acts to permit the flow of water through it, to thus prevent the overflow of the bowl or tub. The upper part of the shell is provided with a top piece having a contracted neck, $e'$, which is extended downward into a cup, $d$, which is supported, as shown, by a brace, $d'$ extended from one to the other side of the bottom piece, $b$, of the shell, substantially as in my application No. 123,976, filed March 7, 1884. The cup $d$ always remains filled with water, and the neck $e'$, extended therein below the surface of the water in the cup, forms a water seal or trap to prevent the passage of sewer-gas into the collar $b'$, and thence out through the neck $e'$. The plug-shell is of such length that it will permit considerable water to accumulate in the bowl or tub in which it is placed before the water commences to run through the plug; but as soon as the water in the said bowl or tub rises above the top of the plug the water will commence to run over or into the plug and out through the base portion of the same.

The neck and the cup or receptacle to hold a limited amount of water constitute the trap.

In my application referred to I have shown a valve provided with a recess at top for the reception of water to seal the plug; but I do not there broadly claim a trapped plug or a plug without a valve.

In the drawing I have shown the upper part of the plug-shell as provided with holes $p$, for the entrance of water through its sides.

I do not desire to limit my invention to the exact construction of the cup or water-holding portion of the trap whereby it is sealed by water, and instead of the particular means shown I may employ any other usual form of water-sealing device.

I claim—

A plug having a passage through it for water, and provided with means for water-sealing the same, substantially as described.

In testimony whereof I have signed my name to this specification in the presence of two subscribing witnesses.

JAMES D. BACON.

Witnesses:
   G. W. GREGORY,
   W. H. SIGSTON.